United States Patent [19]

Simms

[11] Patent Number: 4,948,210

[45] Date of Patent: Aug. 14, 1990

[54] INFRARED ZOOM ILLUMINATOR

[75] Inventor: Robert A. Simms, Phoenix, Ariz.

[73] Assignee: Murasa International, Long Beach, Calif.

[21] Appl. No.: 208,457

[22] Filed: Jun. 20, 1988

[51] Int. Cl.$^5$ .............................................. G02B 27/02
[52] U.S. Cl. ................................. 350/1.4; 250/338.1;
   350/237; 350/255; 362/277
[58] Field of Search ................. 350/1.4, 413, 423, 429,
   350/235, 236, 237, 1.2, 255; 362/277, 326, 307,
   308, 309; 250/330, 504 H

[56] References Cited

U.S. PATENT DOCUMENTS

| 2,586,723 | 2/1952 | Sakols | 350/237 |
| 3,285,242 | 11/1966 | Wallace | 362/277 X |
| 3,443,166 | 5/1969 | Ing et al. | 317/234 |
| 3,582,181 | 6/1971 | Dolores et al. | 350/236 |
| 3,781,560 | 12/1973 | DeBurgh et al. | 250/333 |
| 3,945,717 | 3/1976 | Ryder et al. | 350/236 |
| 4,027,159 | 5/1977 | Bishop | 250/338 |
| 4,467,190 | 8/1984 | Hadani | 250/213 VT |
| 4,504,950 | 3/1985 | AuYeung | 350/413 X |

OTHER PUBLICATIONS

Uchida, T. et. al., "Optical Characteristics of a Light--Focusing Fiber Guide and Its Applications", *IEEE Journal of Quantum Electronics*, vol. QE-6, No. 10, Oct., 1970, pp. 606–12.

*Primary Examiner*—Bruce V. Arnold
*Assistant Examiner*—Martin Lerner
*Attorney, Agent, or Firm*—LaValle D. Ptak

[57] ABSTRACT

An infrared zoom illuminator is contained in a cylindrical housing which may be hand-held. Power is provided to an infrared laser light source from batteries contained in the housing, and a micro lens made of gradient index material is placed between a light exit opening in the housing and the laser light source. Provision is made for selectively interconnecting and disconnecting the light source from the power supply and for changing the distance between the laser light source and the lens. This changes the focus of light exiting from the device from a predetermined maximum divergence, for illuminating a zone, down to the collimated narrow beam of light produced by the laser light source.

14 Claims, 2 Drawing Sheets

INFRARED ZOOM ILLUMINATOR

BACKGROUND

Radiant energy detectors are widely used in a variety of night vision systems for providing the capability of visually observing objects of interest which cannot be seen with the naked eye under conditions of very low light, as occur at night. Modern detectors of such radiant energy fall into three broad categories, namely, photoconductive, photovoltaic, and photo-emissive. These families of detectors are well known and are widely used. The two classes which are of primary interest in conjunction with the system of the present invention are radiant energy detectors of the photo-emissive type, typified by photomultipliers and image intensifiers, and the photovoltaic type, exemplified by charge coupled detectors (CCDS) or charge induced detectors (CIDS). These particular classes of detectors have a spectral sensitivity which is compatible with infrared radiant energy.

Detectors of this type are extensively used in devices known as image intensifiers. Although many variations of image intensifiers exist, a class of such intensifiers which is in wide use and which illustrates the characteristics of such devices consists of an objective lens, a photocathode, and a phosphor screen followed by a viewing lens. An appropriate housing and a power source to activate the device are included. Image intensifier systems of this type function as follows:

The user of the device focuses the objective lens upon a certain object of interest. Typically, the object cannot be seen with the naked eye, because of the dim, nighttime light conditions. The focused radiation from the object is directed to a layer of material (the photocathode) which has the property of converting the focused incident radiation from the target object into photoelectrons. This section of the device generally is in a vacuum environment. The photoelectrons are released into the vacuum, and, as a result of the focused radiation, are caused to be focused and accelerated into a phosphor layer. This layer provides a radiation output in response to the photoelectron intrusion. Radiation amplification is provided through the energy added to the photoelectrons through the acceleration means; and when the phosphor screen is viewed through the viewing lens, the object is clearly seen.

Other more sophisticated devices for providing amplification in image intensifiers are presently available through the use of components such as microchannel plate amplifiers. These and other photoelectron amplifying devices are described extensively in current literature.

In summary, image intensifier devices serve to focus an electro-optical system onto a dimly lighted target object, and amplify the radiant energy from that object sufficiently that the object becomes more visible through the viewing lens of the image intensifier device. Such devices, however, have severe limitations. A dominant limitation is the inability of such devices to provide an amplified image of an object in circumstances where the radiant energy from the object is too low for the detector system to detect. For example, some night vision systems depend upon reasonable levels of starlight reflected from the object in order to present the viewer with a useful, recognizable image. In the presence of overcast, available starlight is suppressed or significantly reduced; and the image intensifier or amplifier function cannot respond. In daylight conditions, of course, such devices are not used since adequate acquisition of an object is available through ordinary means. Another environment in which image intensifiers of the type described do not work is at night in enclosed buildings such as warehouses, storage lockers, and the like, since there is no dim source of light which can be amplified by the image intensifier device.

A patent which is directed to a system for close range image enhancement is the Patent to DeBurgh #3,781,560. This patent discloses an infrared night vision device in the form of night vision goggles, coupled with an infrared light source for illuminating close objects, such as the pages of a book being read. There is no disclosure in this patent, however, of any medium or long distance image enhancement, nor is there any disclosure of the utilization of an infrared light as a point source target indicator.

A Patent to Bishop #4,027,159 discloses an image enhancement device using near infrared radiation from a source which functions in conjunction with a far infrared detector. The far infrared detector, however, is not a visual detector, but instead produces an audio output.

A Patent to Hadani #4,467,190 is directed to night vision binoculars which have a built-in image intensifier in them. These binoculars are typical of such night vision equipment. No supplemental infrared light source, however, is utilized or disclosed for use in conjunction with the binoculars. The binoculars simply intensify the infrared radiation from an object under observation. Infrared illumination of the object by some supplemental source is not contemplated in the device disclosed in this patent.

Solid state light emitting devices such as light emitting diodes (LEDs) and laser diodes (LDs) presently are well known and are utilized for a wide variety of applications. The LEDs generally provide output radiation over a relatively wide angle, whereas the LDs (laser diodes) provide a narrowly focused radiation. For infrared radiation at wave lengths which are compatible with most presently available night vision image enhancement devices, light emitting diodes and laser diodes based on Gallium Arsenide or Gallium Arsenide Aluminum materials are of primary interest. These devices are relatively small and operate on low amounts of power. They do not emit light which is visible to the naked eye, so that if they are to be observed, night vision detectors must be used to see them or to see objects which are illuminated by them. A patent disclosing the structure of such a Gallium Arsenide light emitting diode is the Patent to Ing #3,443,166. This patent discusses the utilization of the diode in conjunction with microelectronic circuits of the type used in computers and the like.

Optical zoom lenses of various constructions are commonly employed in telescope equipment used in conjunction with cameras, binoculars and the like. Such zoom lenses are employed to change the magnification power of the system and frequently are used in photographing or watching outdoor sports activities, wildlife, etc.

It is desirable to provide an infrared illumination system which can be used to supplement or be substituted for low light conditions to expand the usefulness of image enhancement devices. In addition, it is desirable to provide an infrared illuminator with zoom characteristics to expand or compress the field of illumination from an infrared laser diode light source.

SUMMARY OF THE INVENTION

It is an object of this invention to provide an improved infrared light system.

It is another object of this invention to provide an improved infrared laser light system.

It is an additional object of this invention to provide an improved portable, infrared zoom illuminator.

It is a further object of this invention to provide an improved infrared laser zoom illuminator for use in conjunction with night vision enhancement equipment.

In accordance with a preferred embodiment of this invention, a portable infrared zoom illuminator comprises a housing which has a light exit opening in it. An infrared laser light source is placed in the housing along with a power supply. A switch is provided to selectively interconnect and disconnect the laser light source and the power supply. A focusing lens is mounted in the housing between the light source and the light exit opening, and a device is provided in conjunction with the lens to change the focus of the light which exits from the light exit opening in the housing. The light pattern varies from a predetermined maximum divergence, which produces an infrared illumination of a relatively wide area, to a beam of light, which is equal to the collimated width of the beam of light from the infrared laser light source.

DETAILED DESCRIPTION

Figure 1:
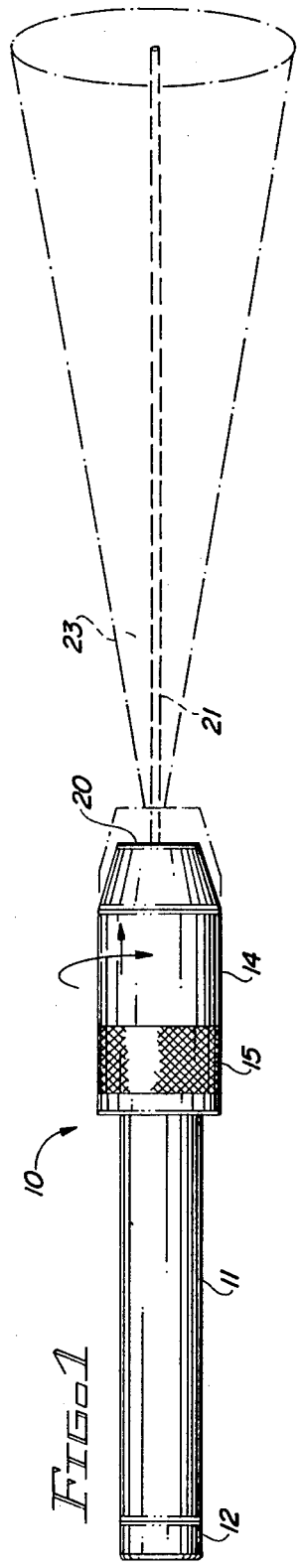
FIG. 1 is a side view of a preferred embodiment of the invention.

Reference now should be made to the drawings in which the same reference numbers are used throughout the various figures to designate the same components. FIG. 1 shows the overall configuration of a portable infrared illuminator 10 in accordance with a preferred embodiment of the invention. The illuminator 10 comprises a main body portion 11 in the form of an elongated cylinder closed at the left-hand end by a threaded cap 2. The right-hand end has a rotatable cylindrical head 14 on it, with a knurled section 15 to assist in rotating the head. Light exits from an opening 20 in the right-hand end; and by rotating the portion 14 relative to the body portion 11, the portion 14 is moved back and forth axially from the position shown in solid lines in FIG. 1 to the dotted line position shown in FIG. 1. This causes a change in the focus of light emitted from a laser light source 60 within the device, from a narrow collimated pencil-like beam 21 to a maximum diverging spread of light 23. At positions intermediate the solid line and dotted line positions shown in FIG. 1, the beam of light varies in divergence between the beams 21 and 23 illustrated.

Figure 2:
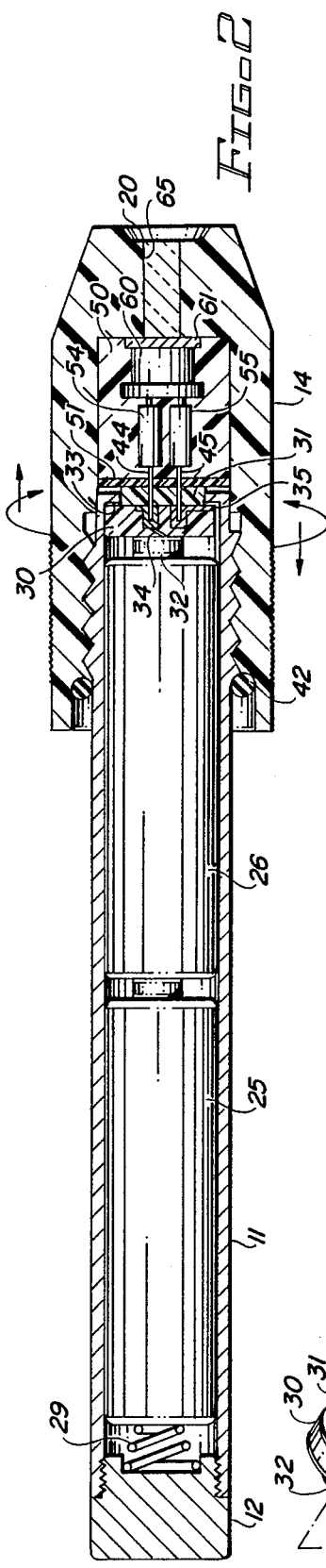
FIG. 2 is an enlarged sectional view of the embodiment shown in FIG. 1.
Figure 3:
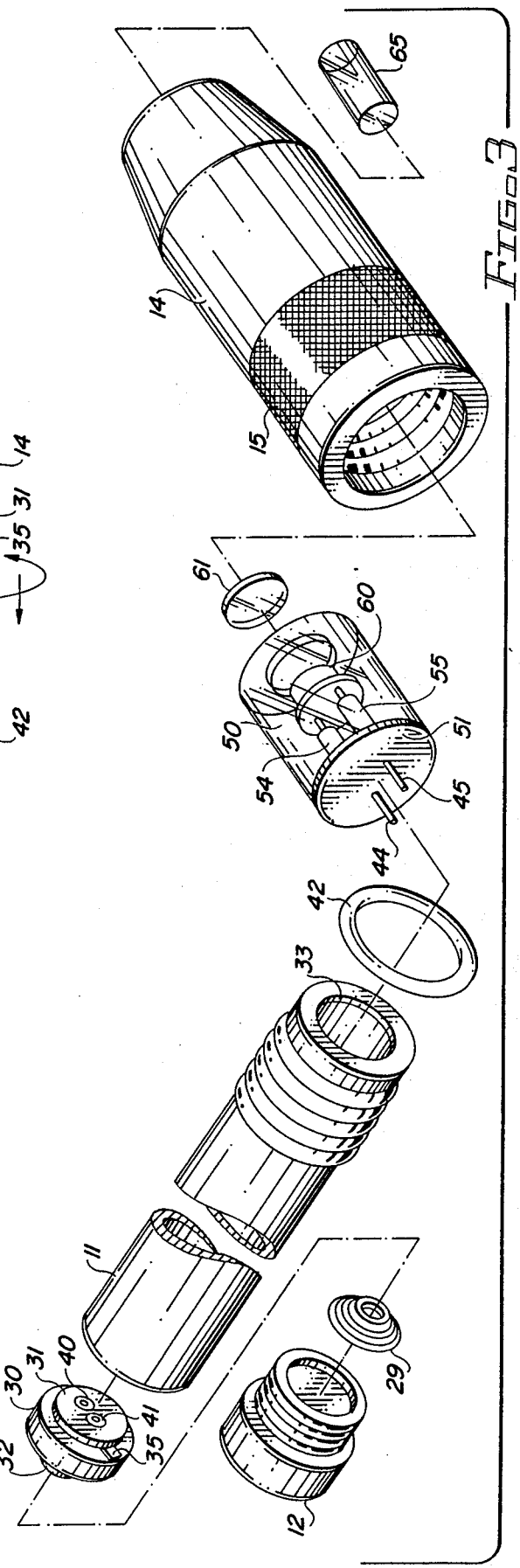
FIG. 3 is an exploded view of the embodiment shown in FIGS. 1 and 2.

FIGS. 2 and 3 comprise cross-sectional and exploded views, respectively, of the device of FIG. 1 which more clearly indicate the manner in which the device is constructed and operates. In FIG. 1, the device is illustrated as slightly smaller than actual size and in FIG. 2 it is illustrated larger than actual size. The overall length is approximately six or seven inches, so that it is easily carried and readily handled much in the manner of a small flashlight.

As shown in FIGS. 2 and 4, the main body portion 11 and the cap 12 preferably are made of metal. A pair of batteries 25 and 26 are placed in the portion 11 to act as a power supply for the device. This is done through the right hand end when the cap 12 is removed. A metal spring 29 is compressed between the left hand end of the battery 25 and the cap 12 to provide electrical contact between the body 11 and the battery 25. At the other end of the housing 11, an inwardly turned shoulder 33 is used to limit the movement of the batteries 25 and 26, and an electrical connector block 30, having a projection 31 on it, to a maximum rightward (as viewed in FIG. 2) movement under the urging of the spring 29.

Assembly of the device is effected by first inserting the connector block 30, 31 into the housing 11 from the left hand end, as most clearly illustrated in FIG. 3. Then the batteries 25 and 26 are placed in the housing 11, and the cap 12 and spring 29 are secured on the left hand end to hold everything in place. Without placement of the outer cylindrical portion or head 14, the spring 29 urges the portion 30 of the connector block 30, 31 into engagement with the shoulder 33. This causes contact between a conductive metal connector tab 35, which is electrically interconnected with a socket 41, to complete an electrical connection between the tab 35 and the metal housing 11. Another electrical socket 40 is interconnected by a wire 34 (see FIGS. 4A through 4C) to a contact 32 which engages the contact on the right hand end of the battery 26, as shown in FIG. 2.

The assembly is completed by threading the head 14 onto the right hand end of the housing 11. Mating threads of a relatively course pitch are provided on the outside of the body 11 and the inside of the head 14, respectively. A rubber or neoprene O ring 42 fits over the body 11 and engages the open end of the head 14 to provide a water-tight seal between the two parts, as shown most clearly in FIG. 2. An encapsulated electronics package housing 50 is placed within the head 14, and the package 50 has a base plate 51 through which a pair of male electrical contact pins 44 and 45 extend. These pins are located to fit within, and make electrical contact with, the sockets 40 and 41, respectively. This is illustrated most clearly in FIGS. 2 and 4.

The encapsulated electronics package 50 is loosely held within the head 14. When the pins 44 and 45 are inserted into the sockets 40 and 41, the head 14 is permitted to rotate about the housing 50, which is prevented from rotation by the connector pins 44 and 45. Within the housing 50, a pair of current limiting resistors 54 and 55 are connected from the pins 44 and 45 to the electrical contacts of an infrared laser diode 60 of any suitable type (such as a GaAIAs or GaAsCW with a wavelength of 780 nm). This laser diode power on the order of 5 millowatts or more, and produces a laser beam (in the infrared spectrum) having a diameter 1.5 microns or less in size. The orientation of the laser diode 60 is such that this beam is centered on the axis of the housing 11 and the head 14.

To insure that no visible light is emitted from the device, a filter 61 also may be cemented into a circular opening in the right-hand end of the housing 50 in contact with the light emitting end of the laser diode 60. The characteristics of the filter 61 are such that it passes wave lengths of light in the infrared region, but blocks wave lengths of light in the visible region. If some visible light leakage is not considered detrimental for some applications, the filter 61 could be eliminated, although in most cases it is desirable to provide the filter 61 for the infrared illuminator.

The head 14 has a cylindrical hole through it at the right-hand end, as shown most clearly in FIGS. 2 and 4, communicating with the light exit opening 20. This cylindrical hole or bore has a micro lens 65 secured in it. The lens 65 is secured in any suitable manner, including a force friction fit or cementing it in place by means of a suitable adhesive. Ideally, the lens 65 is a micro lens made of gradient index material exhibiting a parabolic refractive index distribution which is highest at its optical axis and which decreases toward its periphery. In such lenses, light travels sinusoidally through the material. A lens which is commercially available and which is ideally suited for the infrared zoom illuminator of this invention is the SELFOC micro lens produced by Nipon Sheet Glass Company, of Tokyo, Japan and distributed by NSG America, Inc. Such micro lenses perform the same optical functions as standard spherical lenses, but have an added benefit in that the end surfaces are flat, as illustrated, and do not required the precision grinding, alignment, etc. which is required for standard glass optical lenses.

Figure 4C:
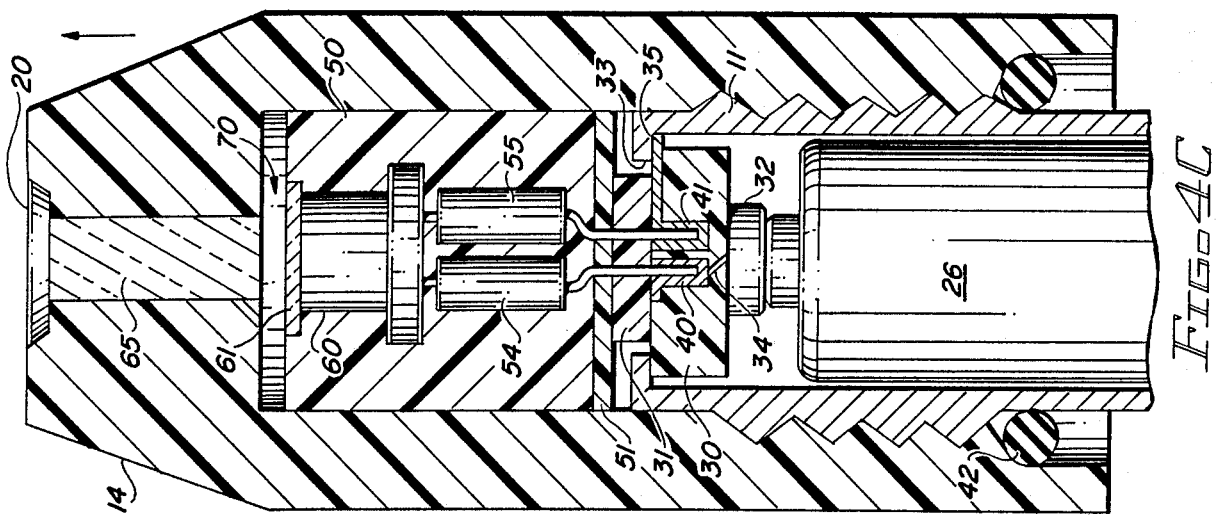
FIGS. 4A through 4C are detailed enlarged cut-away sections of a portion of the device shown in FIGS. 2 and 3 to illustrate operating characteristics.
Figure 4B:
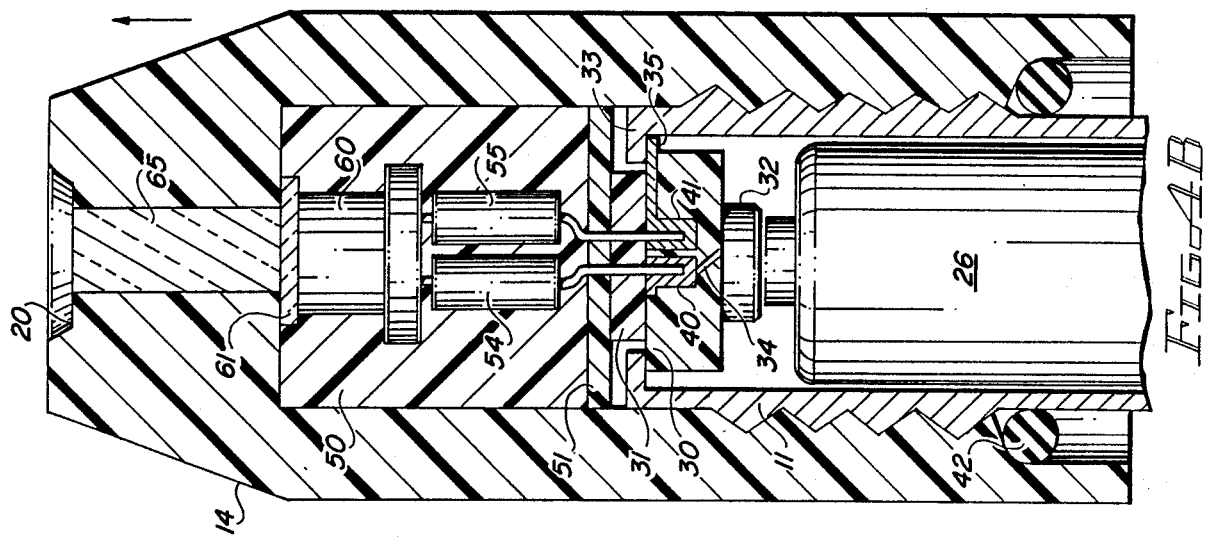
Figure 4A:
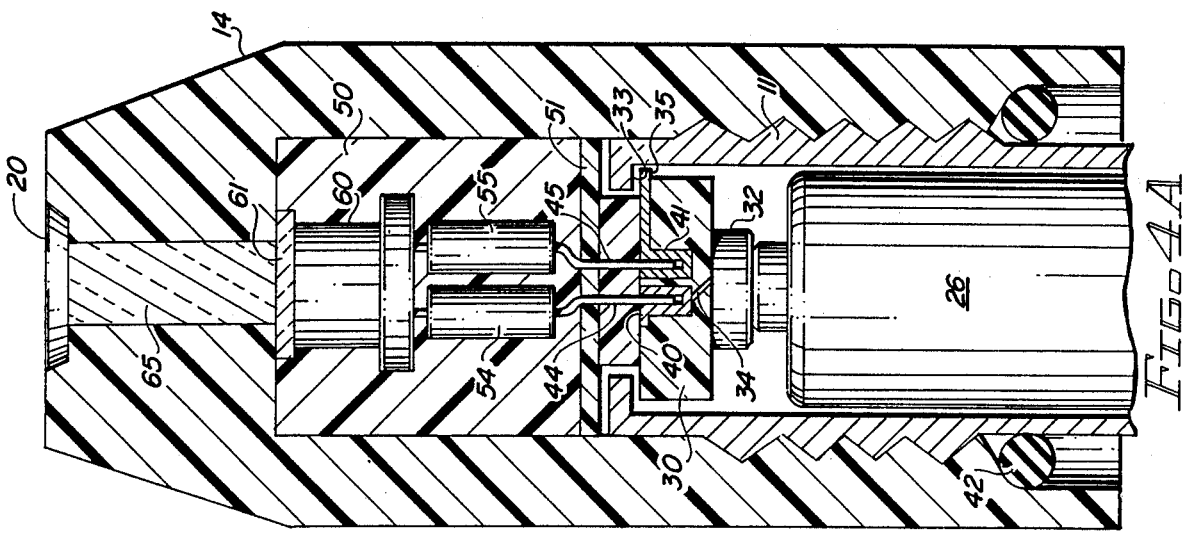

To accomplish the change in the beam divergence from the focused laser beam 21 to the maximum divergence beam 23 shown in FIG. 1, the head 14 is rotated relative to the housing 11 about the common axis of the housing 11 and head 14. Reference should be made to the greatly enlarged illustrations of head end (the right-hand end of FIG. 2) which are shown in FIGS. 4A through 4C. These three figures illustrate three different conditions of operation of the device.

FIG. 4A shows the head 14 rotated clockwise a maximum amount to cause the unit to be in its "off" condition of operation. It should be noted that once the device is assembled, the pins 44 and 45 are seated securely in the sockets 40 and 41 to hold the connector block 30/31 in tight engagement with the base 51 of the block 50. This is illustrated clearly in FIGS. 4A through 4B which indicate all of these parts in tight abutment with one another. Then, when the head 14 is rotated to its "tight" clockwise position, the abutment between the interior of the head 14 and the upper end of the block 50 (as viewed in FIGS. 4A through 4C) pushes the block 50 downwardly to push the connector block 30/31 downwardly against the end of the battery 26 to the position shown in FIG. 4A. In this position, a slight space exists between the tab 35 and the shoulder 33 of the housing 11; so that the return or ground electrical connection of the series circuit through the battery 26 and the laser diode 60 is opened. This is the "off" position of the device. It should be noted that, in this position, the lowermost end of the lens 65 (as viewed in FIGS. 4A through 4C) is in abutment with the filter 61 mounted on the end of the infrared diode 60.

FIG. 4B illustrates the condition of operation of the device when the head 14 is rotated a slight amount counterclockwise to cause it to move upwardly (as viewed in FIG. 4B) a short distance relative to the hOusing 11. As this occurs, the pressure of the spring 29 (FIGS. 2 and 3), pushing on the batteries 25 and 26, causes the batteries and the connector block 30, 31, to move upwardly until the contact tab 35 engages the shoulder 33. Electrical contact is now established and the laser diode 60 is turned on to produce the laser beam of light 21 in the infrared region in a conventional manner. At this point of initial contact, the narrow focused collimated beam of light 21 is produced. This beam of light is transmitted unchanged through the lens 65 and out of the light exit opening 20 of the device. The laser beam may be used in conventional fashion for any suitable purpose which is inherent in a low power infrared laser.

It should be noted that the range of the laser beam 21 is substantial, of the order of several miles. Obviously, the spot produced by the laser beam 21 when it intersects a target can only be observed by a person who is equipped with night vision enhancement goggles of the type discussed above. With such equipment, however, the intersection of the beam 21 with any desired target readily may be ascertained.

FIG. 4C illustrates the condition of operation used to change the divergence of the beam produced by the infrared laser diode 60 from its normal collimated focused spot beam 21 to a beam of increasing divergence. This is accomplished by continuing rotation of the head 14 in a counter-clockwise direction relative to the housing 11. This causes the head 14 to move axially outwardly a greater distance from the upper end of the housing 11 (as viewed in FIG. 4C). Since the block 30 and the contact tab 35 engage the shOulder 33 of the housing 11, no further upward movement (as viewed in FIG. 4C) of the connector block 30,31 and of the housing 50 takes place. The housing 50 is held securely against the block 31 by means of the connector pins 44 and 45, as described previously. Since the housing 50 no longer moves upwardly with the head 14, the head 14, and the lens 65 which is secured in it, move away from the filter 61 to form a space 70 between the lower end of the lens 65 and the filter 61 over the laser diode 60. This space varies in distance depending upon the amount of rotation (and therefore longitudinal axial movement) of the head 14.

As the head 14 is moved farther away from the laser diode 60 and the filter 61, the beam of light is spread by the lens 65 in an increasingly wider divergence. The effect of this is an area illumination which can be observed by a person wearing infrared night vision enhancement equipment. Consequently, the infrared laser beam is changed into a zone illuminator to permit observance of a varying area, depending upon the width of the space 70 which is produced by rotation of the head 14 about the housing 11. Once a particular target has been located within this area, the head 14 is rotated clockwise back to the position shown in FIG. 4B, at which time the focused infrared laser beam 21 once again is produced by the device through the lens 65 for use in a conventional manner as a low energy laser.

Typically the laser 60 is a solid state laser, but it is not necessary for solid state laser to be used. Also, the current limiting resistors 54 and 55 are typical but the amount of resistance is dependant upon the characteristics of the laser diode 60 used and the amount of power generated by the batteries 25 and 26. In the version which is illustrated, the batteries 25 and 26 are standard "A" size batteries, each producing 1.5 volts of power.

The preferred embodiment, which is shown in the drawings and which has been described above, is to be considered illustrative of the invention and not as limiting. Various changes and modifications will occur to those skilled in the art for providing the effect of changing a laser beam to an illuminating beam and vice-versa, without departing from the true scope of the invention. For example, the relative sizes of the different components and the materials which have been described are illustrative only. Obviously, the housing 11 may be made of insulating material if a return electrical path is provided for a connection between the tab 35 and the spring 29 within the housing 11. In addition, the manner in which the housing 11 and head 14 telescope with respect to one another may be effected in a manner different from the one illustrated. The particular configuration or interconnection of the parts also can be varied without departing from the scope of the invention, and other changes will occur to those skilled the art while remaining within the true scope of the invention as defined in the following claims.

I claim:

1. A portable infrared zoom illuminator including in combination:
   a housing having a light exit opening therein;
   an infrared laser light source mounted in said housing;
   a power supply located in said housing;
   switch means selectively interconnecting and disconnecting said light source and said power supply;
   focusing lens means comprising a cylindrical micro lens of gradient index material mounted in said housing between said light source and the light exit opening in said housing; and
   means coupled with said lens means for moving said lens moved toward and away from said light source to change the focus of light exiting from said light exit opening in said housing from a predetermined maximum divergence to the narrow collimated width of the beam of light produced by said infrared laser light source.

2. The combination according to claim 1 wherein said power supply is a battery power supply.

3. The combination according to claim 2 wherein said housing is a substantially cylindrical housing with the light exit opening in one end thereof and the other end thereof being closed when said zoom illuminator is in use.

4. The combination according to claim 3 wherein said laser light source is a solid state infrared laser light source.

5. The combination according to claim 3 wherein said housing comprises at least first and second telescoping parts, with said parts being axially movable with respect to one another; said lens means is located in said second part of said housing for axial movement therewith toward and away from said laser light source.

6. The combination according to claim 1 wherein said housing comprises at least first and second parts; said power supply is a battery power supply including at least one battery, with the first part of said housing receiving said battery, said first part of said housing having first and second ends, with means for closing the first end thereof having a spring for engaging said battery located therein and the second end thereof being open with an inwardly turned shoulder thereon for supporting electrical contacts therein; and said second part of said housing fits over the second end of said first part of said housing and includes said laser light source and said focusing lens means therein, with means for effecting an electrical interconnection between said laser light source and said battery located in said first part of said housing.

7. The combination according to claim 6 wherein said electrical connecting means comprises an axially movable block biased toward engagement with said shoulder by said spring pressing on said battery to connect with said laser light source with said power supply when said second part of said housing is moved axially away from the first end of said first part of said housing a predetermined distance, and including means in said second part of said housing for biasing said block out of engagement with said shoulder when said second part of said housing is in a second position relatively closer to the first end of said first part of said housing to disconnect said light source from said power supply.

8. The combination according to claim 7 further including means for restricting movement of said laser light source relative to said lens means as said lens moves with said second part of said housing relative to said first part of said housing to vary the distance between said laser light source and said lens means to accomplish said change of focus of light exiting from the light exit opening in said second part of said housing.

9. The combination according to claim 8 wherein said first part of said housing and said spring means are made of conductive material, said second part of said housing is secured for limited axial movement relative to said first part of said housing, said second part of said housing being made of insulating material, and said focusing lens means is mounted in said second part of said housing between said light exiting opening and said laser light source.

10. The combination according to claim 9 wherein said lens has a first end located adjacent said light source and a second end located adjacent said light exit opening, and focusing of said lens means is accomplished by changing the distance between the first end of said lens and said laser light source.

11. The combination according to claim 10 wherein said laser light source is a solid state infrared laser light source.

12. The combination according to claim 1 wherein said power supply is a battery power supply.

13. The combination according to claim 1 wherein said housing is a substantially cylindrical housing with the light exit opening in one end thereof and the other end thereof being closed when said zoom illuminator is in use, said housing comprising at least two telescoping parts, with said parts being axially movable with respect to one another; said lens means being located in said second part for axial movement therewith toward and away from said laser light source.

14. The combination according to claim 1 wherein said laser light source is a solid state laser light source.

* * * * *